(12) United States Patent
Kim et al.

(10) Patent No.: US 8,319,828 B2
(45) Date of Patent: Nov. 27, 2012

(54) HIGHLY EFFICIENT 2D-3D SWITCHABLE DISPLAY DEVICE

(75) Inventors: Dae-sik Kim, Suwon-si (KR); Sergey Shestak, Suwon-si (KR); Kyung-hoon Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1429 days.

(21) Appl. No.: 11/863,515

(22) Filed: Sep. 28, 2007

(65) Prior Publication Data
US 2008/0252720 A1    Oct. 16, 2008

(30) Foreign Application Priority Data
Apr. 12, 2007  (KR) .................. 10-2007-0036177

(51) Int. Cl.
*H04N 13/04* (2006.01)
(52) U.S. Cl. ................. 348/56; 348/42; 348/43; 348/48
(58) Field of Classification Search .................... 348/42, 348/43, 48, 51, 56, E13.029, E13.039, E13.041
See application file for complete search history.

(56) References Cited

U.S. PATENT DOCUMENTS

| | | | | |
|---|---|---|---|---|
| 5,500,765 | A * | 3/1996 | Eichenlaub | 359/463 |
| 5,633,737 | A * | 5/1997 | Tanaka et al. | 349/95 |
| 5,771,085 | A * | 6/1998 | Ochi et al. | 349/158 |
| 6,069,650 | A * | 5/2000 | Battersby | 348/59 |
| 6,137,456 | A * | 10/2000 | Bhagavatula et al. | 345/7 |
| 6,157,124 | A * | 12/2000 | Wakasono | 313/461 |
| 6,163,336 | A * | 12/2000 | Richards | 348/42 |
| 6,166,792 | A * | 12/2000 | Miyawaki et al. | 349/113 |
| 7,250,923 | B2 | 7/2007 | Taira et al. | |
| 7,404,642 | B2 | 7/2008 | Shestak et al. | |
| 7,408,600 | B2 | 8/2008 | Yata et al. | |
| 7,557,871 | B2 | 7/2009 | Matsumoto et al. | |
| 7,626,643 | B2 * | 12/2009 | Ijzerman et al. | 349/15 |
| 7,760,430 | B2 | 7/2010 | Shestak et al. | |
| 7,821,711 | B2 * | 10/2010 | Kim et al. | 359/463 |
| 7,986,374 | B2 * | 7/2011 | Ijzerman et al. | 349/15 |
| 8,004,621 | B2 * | 8/2011 | Woodgate et al. | 349/15 |
| 8,031,276 | B2 * | 10/2011 | Woodgate et al. | 349/15 |
| 8,045,069 | B2 * | 10/2011 | Ijzerman et al. | 349/15 |

(Continued)

FOREIGN PATENT DOCUMENTS

CN       1892289 A       1/2007

(Continued)

OTHER PUBLICATIONS

Communication from the State Intellectual Property Office of P.R. China, dated Jan. 26, 2011, in Chinese Application No. 200810004997.2.

(Continued)

*Primary Examiner* — Lashonda Jacobs
(74) *Attorney, Agent, or Firm* — Sughrue Mion, PLLC (57) ABSTRACT

Provided is a highly efficient 2D-3D switchable display device. The image display device includes a display unit forming an image, and a switching visual field separation unit switching the image formed by the display unit into a 2D image or a 3D image, and comprising a lens array for separating a visual field and a liquid crystal lens controlled so as to have a refractive power offsetting or reinforcing a refractive power of the lens array.

10 Claims, 9 Drawing Sheets

U.S. PATENT DOCUMENTS

| | | | | |
|---|---|---|---|---|
| 2004/0240777 | A1* | 12/2004 | Woodgate et al. | 385/16 |
| 2005/0030301 | A1 | 2/2005 | Harrold et al. | |
| 2005/0062905 | A1 | 3/2005 | Kim et al. | |
| 2005/0157223 | A1* | 7/2005 | Sung et al. | 349/69 |
| 2006/0043980 | A1* | 3/2006 | Verstegen et al. | 324/697 |
| 2006/0098285 | A1* | 5/2006 | Woodgate et al. | 359/495 |
| 2006/0170833 | A1* | 8/2006 | Lin et al. | 349/15 |
| 2007/0008617 | A1* | 1/2007 | Shestak et al. | 359/455 |
| 2007/0024801 | A1* | 2/2007 | Horiuchi et al. | 349/161 |
| 2007/0035672 | A1* | 2/2007 | Shestak et al. | 349/15 |
| 2007/0109400 | A1* | 5/2007 | Woodgate et al. | 348/47 |
| 2007/0296896 | A1* | 12/2007 | Hong et al. | 349/122 |
| 2008/0062172 | A1* | 3/2008 | Lin et al. | 345/424 |
| 2008/0259233 | A1* | 10/2008 | Krijn et al. | 349/15 |
| 2008/0266387 | A1* | 10/2008 | Krijn et al. | 348/51 |
| 2009/0033812 | A1* | 2/2009 | Ijzerman et al. | 349/15 |
| 2009/0073559 | A1* | 3/2009 | Woodgate et al. | 359/465 |

FOREIGN PATENT DOCUMENTS

| | | |
|---|---|---|
| CN | 1936625 A | 3/2007 |
| JP | 2004139054 A | 5/2004 |
| JP | 2004258631 A | 9/2004 |
| JP | 2006163388 A | 6/2006 |
| KR | 1020060106726 A | 10/2006 |
| KR | 1020070006122 A | 1/2007 |

OTHER PUBLICATIONS

Office Action issued Jul. 26, 2011 from the State Intellectual Property Office of P.R. China in counterpart Chinese application No. 200810004997.2.

Communication dated Jun. 5, 2012 issued by the Intellectual Property Office of P.R. China in counterpart Chinese Patent Application No. 200810004997.2.

* cited by examiner

HIGHLY EFFICIENT 2D-3D SWITCHABLE DISPLAY DEVICE

CROSS-REFERENCE TO RELATED PATENT APPLICATION

This application claims priority from Korean Patent Application No. 10-2007-0036177, filed on Apr. 12, 2007, in the Korean Intellectual Property Office, the disclosure of which is incorporated herein in its entirety by reference.

BACKGROUND OF THE INVENTION

1. Field of the Invention

The present invention relates to a 2-dimensional (2D)/3-dimensional (3D) switchable display device, and more particularly, to a 2D-3D switchable display device that can easily convert between displaying 2D and 3D images, can be easily mass-manufactured, and has low power consumption.

2. Description of the Related Art

Recently, 3-dimensional display devices have been used in various fields, such as medical imaging, games, advertisements, education, military applications, etc. Also, many studies have been undertaken to display 3D images using holographic and stereoscopic techniques.

The holographic technique is an ideal technique, but it requires a coherent light source, and thus it is difficult to record and reproduce a large-sized object located at a long distance using this technique. On the other hand, the stereoscopic technique employs a stereoscopic effect caused by a binocular parallax between two 2-dimensional images that are respectively seen by the two eyes of a user. Since the stereoscopic technique is performed using two planar images, 3D images with high resolution and great depth may be displayed in a simple manner. The stereoscopic technique is classified into a glasses-type display technique, which utilizes polarized light and a shutter to allow two eyes to see separate images, and a glassesless-type autostereoscopic display technique, in which a display device directly separates images to form fields of view. In the case of a glassesless-type autostereoscopic display device, the number of viewers is restricted because an observation range is fixed. Nevertheless, the glassesless-type autostereoscopic display device is generally preferred to a display device that requires viewers to wear additional glasses.

The glassesless-type autostereoscopic display device is classified into a parallax barrier type and a lenticular type. The parallax barrier type display realizes a stereoscopic image by separating light in left eye and right eye directions by a barrier in order to form a binocular parallax. Since, in the parallax barrier type display, light is blocked by the barrier, it is almost inevitable that light efficiency decreases. On the other hand, the lenticular type display realizes a stereoscopic image by disposing images corresponding to the left and right eyes on a focal surface of a lenticular lens and separating the images into images corresponding to the left and right eyes according to the directional characteristic of the lenticular lens. That is, since an image is separated into left and right images using all light in the lenticular type display, the lenticular type display is more advantageous than the parallax barrier type display in terms of light efficiency.

Figure 1:
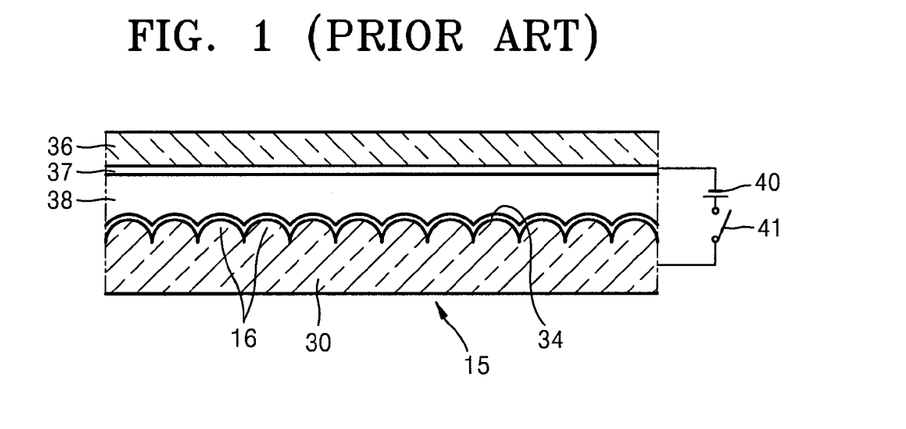
FIG. 1 is a view illustrating a conventional 2D-3D display apparatus.

FIG. 1 is a view illustrating a conventional 2D-3D display apparatus disclosed in U.S. Pat. No. 6,069,650. The 2D-3D display apparatus includes a lenticular means 15. The lenticular means 15 includes a lenticular sheet 30, a liquid crystal layer 38, and a plate 36. A transparent conductive film 34 is placed between the lenticular sheet 30 and the liquid crystal layer 38. A transparent conductive film 37 is also placed between the liquid crystal layer 38 and the plate 36. The lenticular sheet 30 includes a lenticular element 16. The 2D-3D display apparatus includes a power source 40 for applying power to the liquid crystal layer 38 and a switch 41.

In FIG. 1, when the power source 40 is switched on or off, refraction indexes of the liquid crystal layer 38 and the lenticular sheet 30 are the same or different, respectively. When the refraction index of the liquid crystal layer 38 is the same as that of the lenticular sheet 30, light incident on the lenticular sheet 30 passes through the lenticular sheet 30 and the liquid crystal layer 38 without refraction to form an image in a 2D mode. On the other hand, when the refraction index of the liquid crystal layer 38 is different from that of the lenticular sheet 30, images are separated into left and right images to be displayed by the lenticular sheet 30. Thus, an image in a 3D mode is formed.

Since the lenticular element 16 having a spherical shape is formed on a lower surface of the liquid crystal layer 38, the thickness of the liquid crystal layer 38 increases. Accordingly, since a driving voltage should be increased, power consumption is increased. Also, it is difficult to continuously control the liquid crystal layer 38 having a spherical shape. In addition, since the lenticular means 15 is formed by filling a lens with liquid crystal, which requires a special manufacturing technique, and it is difficult to switch the liquid crystal layer 38, the reliability of the 2D-3D display apparatus is low.

SUMMARY OF THE INVENTION

The present invention provides a 2D-3D switchable display device that has low power consumption and can be easily mass-manufactured.

According to an aspect of the present invention, there is provided a 2D-3D switchable display device including: a display unit forming an image; and a switching visual field separation unit switching the image formed by the display unit into a 2D image or a 3D image, and comprising a lens array for separating a visual field and a liquid crystal lens controlled so as to have a refractive power offsetting or reinforcing a refractive power of the lens array.

The liquid crystal lens may include: a first substrate, on which a first electrode array corresponding to the lens array is formed; a second substrate, on which a second electrode array corresponding to the first electrode array is formed; and a liquid crystal layer formed between the first substrate and the second substrate.

The first electrode array may include a plurality of first electrodes facing each interface of a plurality of lenses comprised in the lens array, and the second electrode array may include a plurality of second electrodes facing the plurality of first electrodes.

When voltage is applied to the first electrode array so that the adjacent first electrodes have electric potential of the same absolute value and opposite sign to each other, and a voltage is not applied to the second electrode array, a 3D image may be formed, and when voltage is applied to the second electrode array so that the adjacent second electrodes have electric potential of the same absolute value and opposite sign to each other, and a voltage is not applied to the first electrode array, a 2D image may be formed.

The lens array may be a flat type Grin lens array, a lenticular lens array or a micro lens array 2-dimensionally arranged.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus repeated descriptions will be omitted. In the drawings, the thickness of layers and region are exaggerated for clarity.

Figure 2:
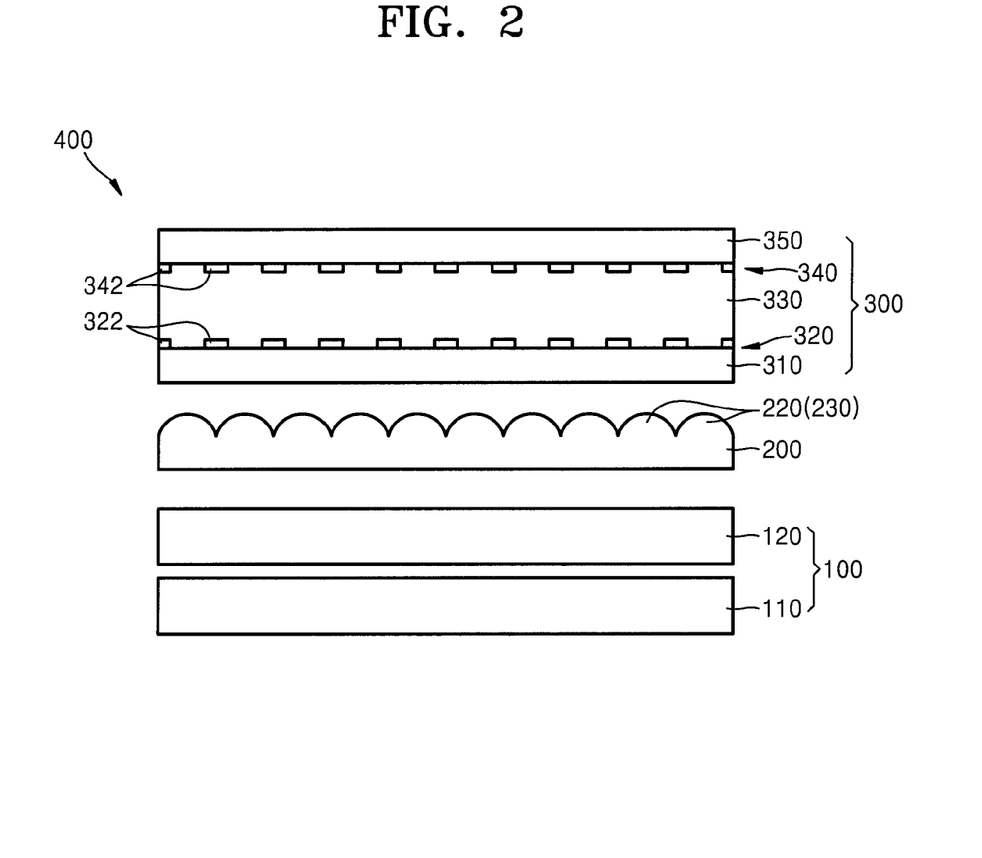
FIG. 2 is a schematic view of a 2D-3D switchable display device according to an exemplary embodiment of the present invention.
Figure 3A:
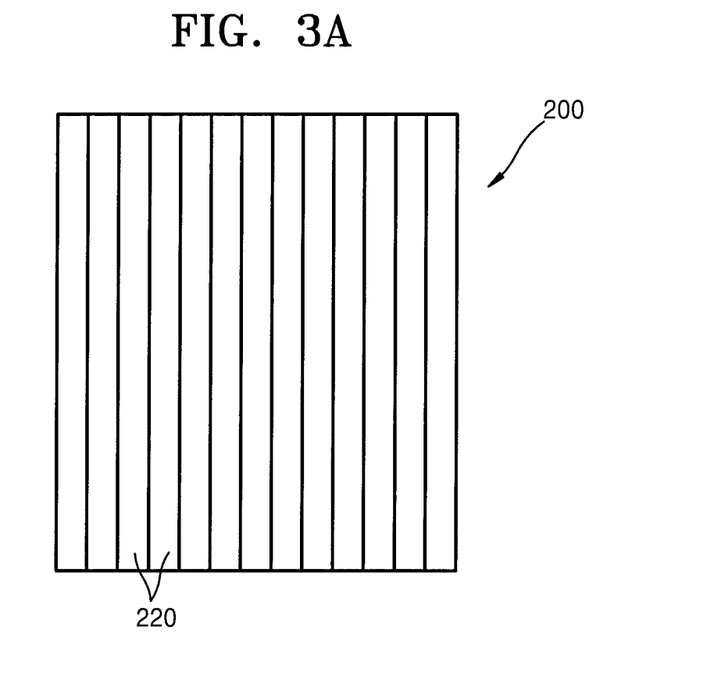
FIGS. 3A through 3D are views illustrating different forms of a lens array illustrated in FIG. 2.
Figure 3B:
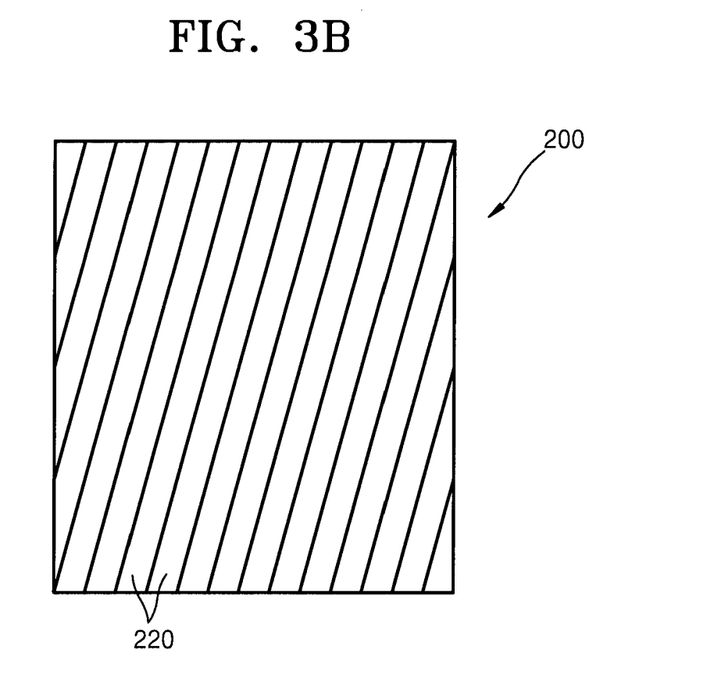
Figure 3C:
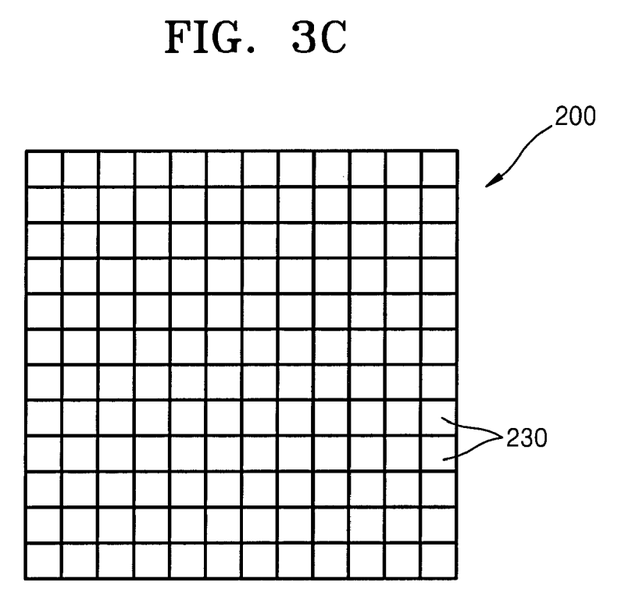
Figure 3D:
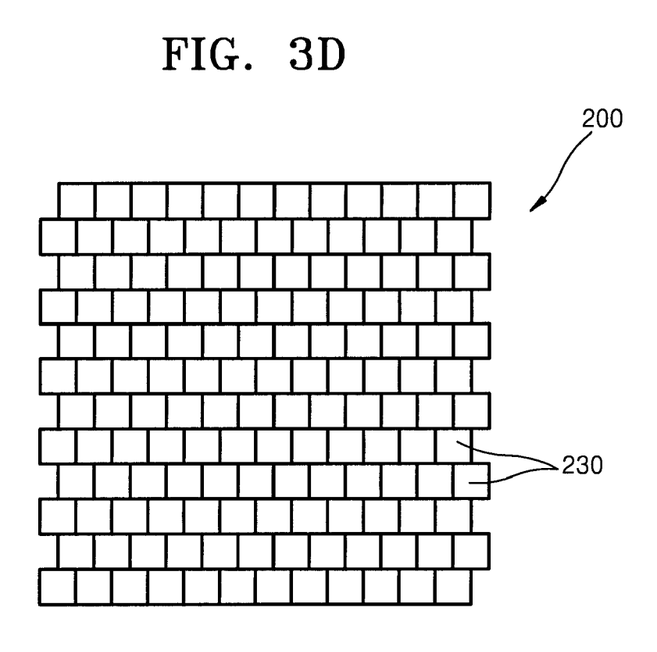
Figure 4A:
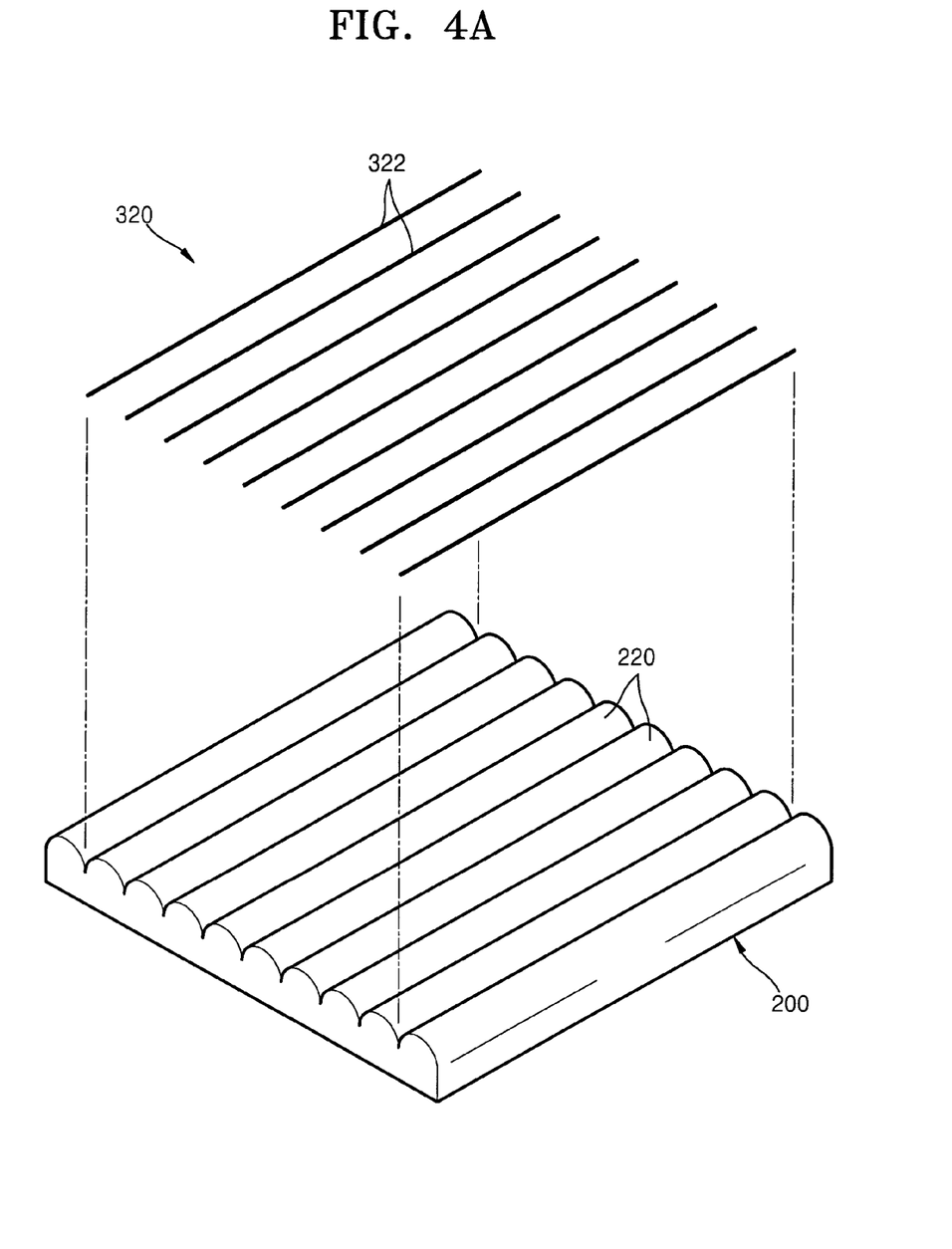
FIGS. 4A and 4B are views illustrating correspondence of a lens array and an electrode array, according to exemplary embodiments of the present invention.
Figure 4B:
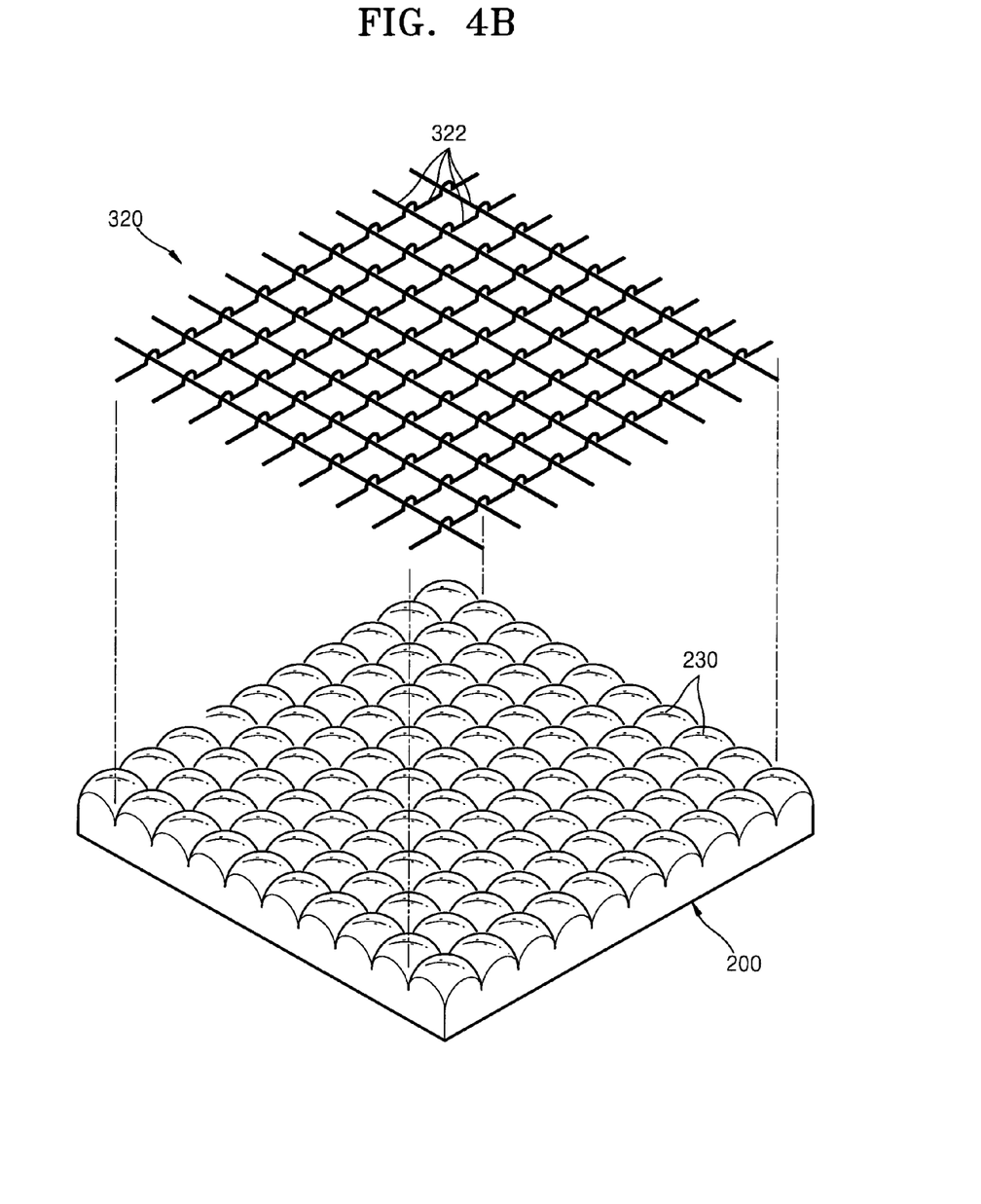

FIG. 2 is a schematic view of a 2D-3D switchable display device 400 according to an exemplary embodiment of the present invention. FIGS. 3A through 3D are views illustrating different forms of a lens array 200 illustrated in FIG. 2. FIGS. 4A and 4B are views illustrating correspondence of a lens array and an electrode array, according to exemplary embodiments of the present invention. Referring to FIGS. 2 through 4B, the 2D-3D switchable display device 400 includes a display unit 100 forming an image, a lens array 200 separating visual fields of an image formed by the display unit 100, and a liquid crystal lens 300 controlled so as to reinforce or offset refractive power of the lens array 200.

The display unit 100 may include a backlight 110 and a display panel 120. A non-emissive display device such as a liquid crystal panel may be included in the display panel 120. Alternatively, a self-emissive display device such as an organic light emitting diode panel may be included in the display panel 120. In this case, the backlight 110 is not required. The display panel 120 can alternately display right and left images in a 3D mode. For example, the display panel 120 may display a column of pixels, alternately.

The lens array 200 separates a visual field formed on the display unit 100 and includes a plurality of lenticular lenses 220 or micro lenses 230. Referring to FIG. 3A, the lens array 200 is arranged so that the lenticular lenses 220 may lengthwise correspond to a vertical direction of the 2D-3D switchable display device. Referring to FIG. 3B, the lens array 200 is arranged so that the length of the lenticular lenses 220 may be inclined with respect to the vertical direction of the 2D-3D switchable display device. When the lenticular lenses 220 are inclined, the resolution of the horizontal direction as well as the resolution of a horizontal direction can be improved. Referring to FIG. 3C, the lens array 200 is arranged so that the micro lenses 230 may be 2-dimensionally arranged. Referring to FIG. 3D, the micro lenses 230 are arranged 2-dimensionally in zigzags. The micro lenses 230 are 2-dimensionally arranged in order to realize high quality 3-D images by the vertical and horizontal parallax.

The liquid crystal lens 300 is controlled so as to have a refractive power that can reinforce or offset the refractive power of lenses included in the lens array 200. That is, the liquid crystal lens 300 acts, as a 2D-mode, offsetting the refractive power of the lens array 200 together with the lens array 200 or, as a 3-D mode, reinforcing the refractive power of the lens array 200, and thus the liquid crystal lens 300 functions as a switching visual field separation unit. The liquid crystal lens 300 includes a first substrate 310 including a first electrode array 320 formed thereon, a second substrate 350 including a second electrode array 340 formed thereon and facing the first electrode array 320, and a liquid crystal layer 330 formed between the first substrate 310 and the second substrate 350. For example, the first electrode array 320 includes a plurality of first electrodes 322. Each of the first electrodes 322 may face each interface of a plurality lenses included in the lens array 200. When the lenticular lenses 220 include the lens array 200, the first electrode array 320 and the lens array 200 are arranged as illustrated in FIG. 4A. When the lens array 200 includes the micro lenses 230 that are 2D-dimensionally arranged, the first electrode array 320 is 2D-dimensionally arranged as illustrated in FIG. 4B. The second electrode array 340 includes a plurality of second electrodes 342 facing the first electrodes 322. First and second electrode array 320 and 340 may be formed of a transparent conductor such as an indium tin oxide (ITO) and indium zinc oxide (IZO). According to whether a voltage is applied between the first and second electrode array 320 and 340, the refractive power of the liquid crystal lens 300 is different. When the refractive power of the liquid crystal lens 300 has the same absolute value and opposite sign with respect to that of the lens array 200, a 2D image is formed by offsetting the refractive power of the lens array 200. When the refractive power of the liquid crystal lens 300 has the same sign with respect to the lens array 200, a 3D image is formed by reinforcing the refractive power of the lens array 200. This will be described later. The first and second electrode array 320 and 340 can have different structure from the structures of FIGS. 2 through 4B such that the first and second electrode array 320 and 340 can correspond to the lens array 200 and control the liquid crystal layer 330 so as to reinforce or offset the lens array 200.

Operations in which the 2D-3D switchable display device 400 forms 2D-3D images are formed will now be described.

Figure 5A:
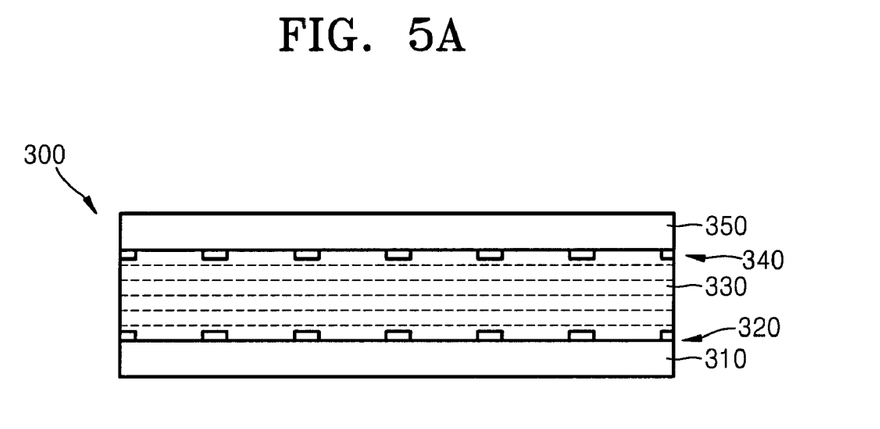
FIGS. 5A through 5C are views illustrating a change of a liquid crystal layer according to a voltage applied to first and second electrode arrays, according to an exemplary embodiment of the present invention.
Figure 5B:
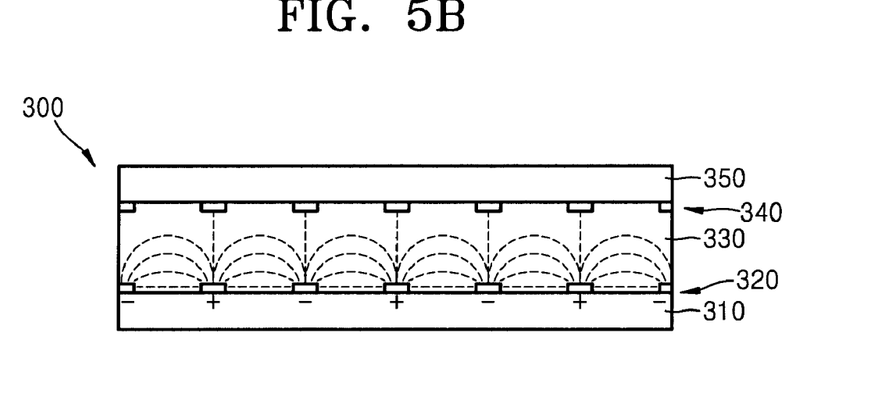
Figure 5C:
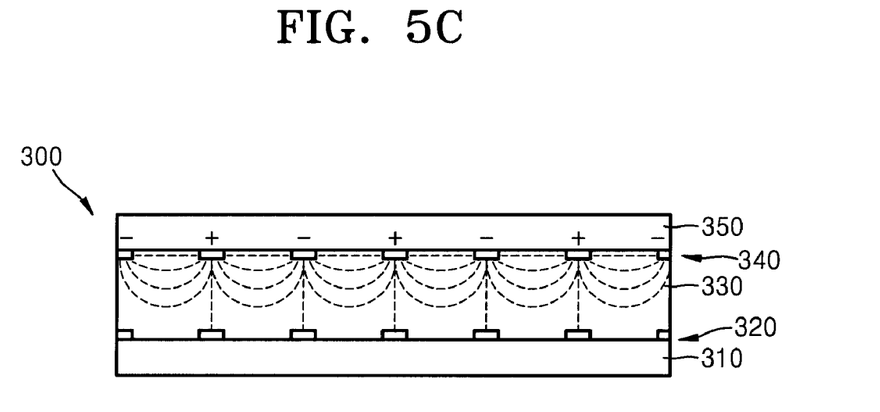

First, referring to FIG. 5A through 5C, the liquid crystal layer 330 is changed according to a voltage applied between the first and second electrode array 320 and 340 as follows. Referring to FIG. 5A, when a voltage is not applied between the first and second electrode array 320 and 340, the liquid crystal lies along a horizontal direction of the liquid crystal layer 330. This case is an example of a TN mode. Referring to FIG. 5B, a voltage is not applied to the second electrode array 340. Voltage is applied to the first electrode array 320 so that the adjacent first electrodes 322 may have electric potential of the same absolute value and opposite sign to each other. In this case, the liquid crystal of the liquid crystal layer 330 is arranged to have a convex shape along an electric field generated along the first electrodes 322. That is, the liquid crystal lens 300 has a refractive power of the same sign as that of the lens array 200. The refractive power of the liquid crystal lens 300 is different according to an arrangement of the liquid crystals in the liquid crystal layer 330. Voltage applying to the first electrode array 320 may be regulated so as the liquid crystal lens 300 together with the lens array 200 to have a refractive power enough to separate a visual field in order to form a 3D image. Referring to FIG. 5C, a voltage is not applied to the first electrode array 320. Voltage is applied to the second electrode array 340 so that the adjacent second electrodes 342 may have electric potential of the same absolute value and opposite sign to each other. In this case, the liquid crystal of the liquid crystal layer 330 is arranged to have a concave shape along an electric field generated along the second electrodes 342. That is, the liquid crystal lens 300 has a refractive power of the opposite sign to that of the lens array 200. The refractive power of the liquid crystal lens 300 is regulated according to a voltage applied to the second electrode array 340. When the voltage completely offsets the refractive power of the lens array 200, a 2D image can be formed.

Figure 6A:
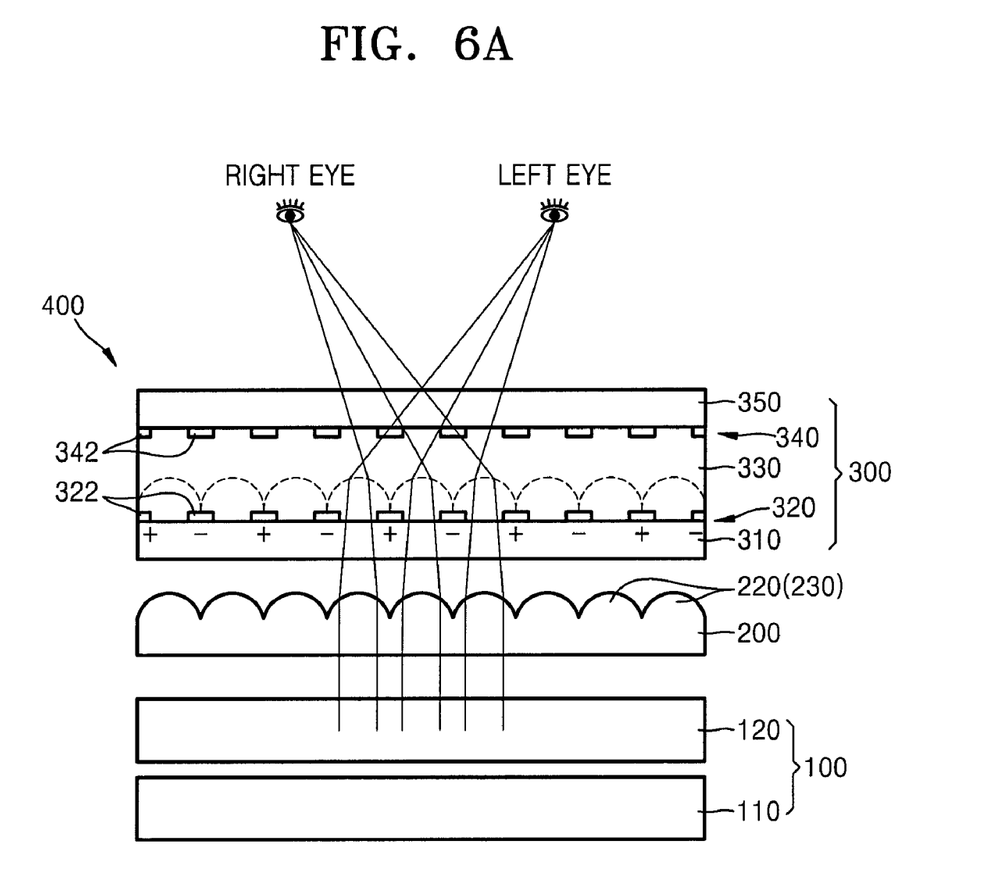
FIGS. 6A and 6B are views illustrating an operation in which the image display apparatus of FIG. 2 forms 2D and 3D images.

FIG. 6A is a view illustrating an operation in which the image display apparatus 400 of FIG. 2 forms a 3D image. In order to form the 3D image, a voltage is applied only to the first electrode array 320 of the liquid crystal lens 300, and a voltage is not applied to the second electrode array 340. Thus, as illustrated in FIG. 5B, since the liquid crystal is arranged to have a convex shape, and has the refractive power of the same sign like that of the lens array 200, the liquid crystal reinforces the refractive power of the lens array 200. For example, when the focal length of a lens included in the lens array 200 is $f_1$, and the focal length of a portion included in the liquid crystal lens 300, which corresponds to the lens included in the lens array 200, is $f_2$, a composed focal length "f" of the lens array 200 and the liquid crystal lens 300 is $f_1*f_2/(f_1+f_2)$. When a refractive power required for forming the 3D image is to be obtained using only the liquid crystal lens 300, the thickness of the liquid crystal layer 330 should be increased. However, in the structure according to the current exemplary embodiment of the present invention, the required refractive power is realized by maintaining the appropriate thickness of the liquid crystal layer 330 and reinforcing the refractive power of the lens array 200. An image formed by the display unit 100 is separated into images respectively directed toward the left and right eyes. Thus, the 3D image can be detected.

Figure 6B:
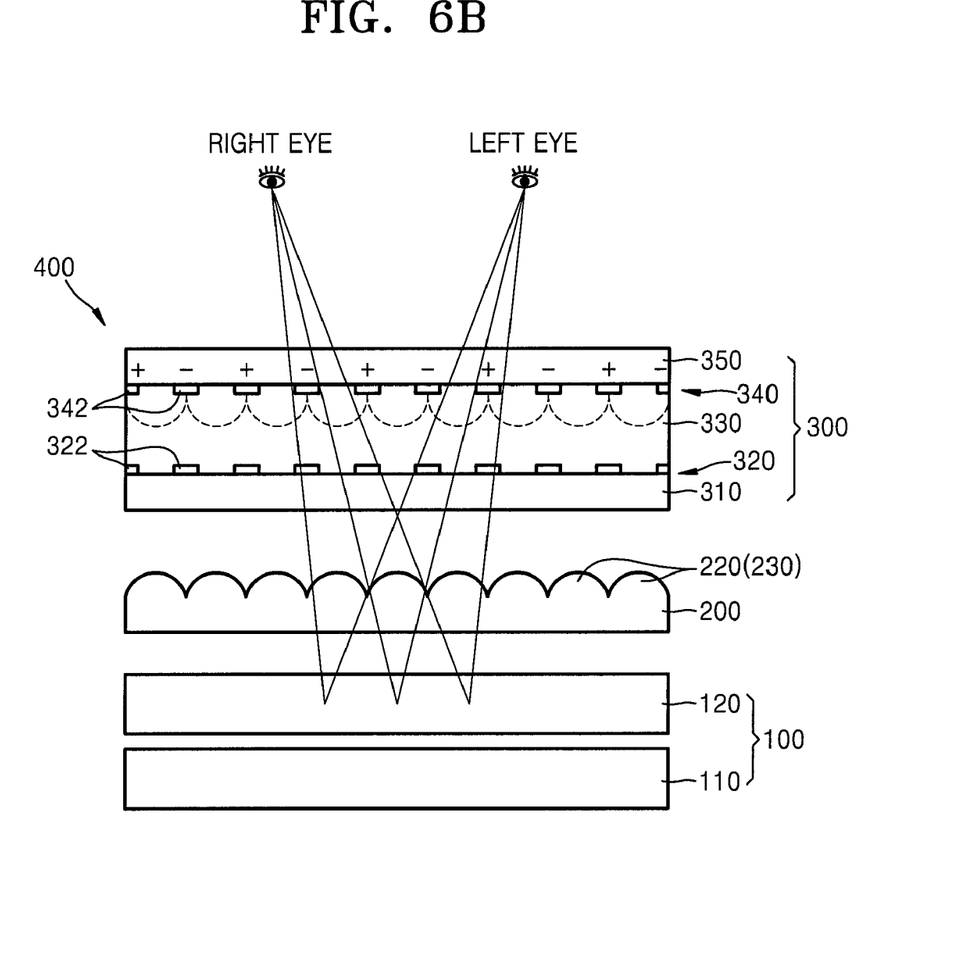

FIG. 6B shows an operation in which a 2D image is formed, according to an exemplary embodiment of the present invention. In this case, a voltage is applied only to the second electrode array 340 of the liquid crystal lens 300, and a voltage is not applied to the first electrode array 320. At this time, as illustrated in FIG. 5C, since the liquid crystal is arranged to have a concave shape, and has the refractive power of the opposite sign to that of the lens array 200, the liquid crystal offsets the refractive power of the lens array 200. For example, when the focal length of a lens included in the lens array 200 is $f_1$, and the focal length of a portion included in the liquid crystal lens 300, which corresponds to the lens included in the lens array 200, is $f_2$, a composed focal length "f" of the lens array 200 and the liquid crystal lens 300 is $f_1*f_2/(f_1+f_2)$. When the liquid crystal lens 300 has the same absolute value of refractive power as that of the lens array 200 by properly regulating a voltage applied to the second electrode array 340, the composed focal length "f" is infinite, and an image formed by the display unit 100 is not separated into images respectively directed toward the left and right eyes. That is, since the same image reaches the left and right eyes, the 2D image is detected.

Figure 7:
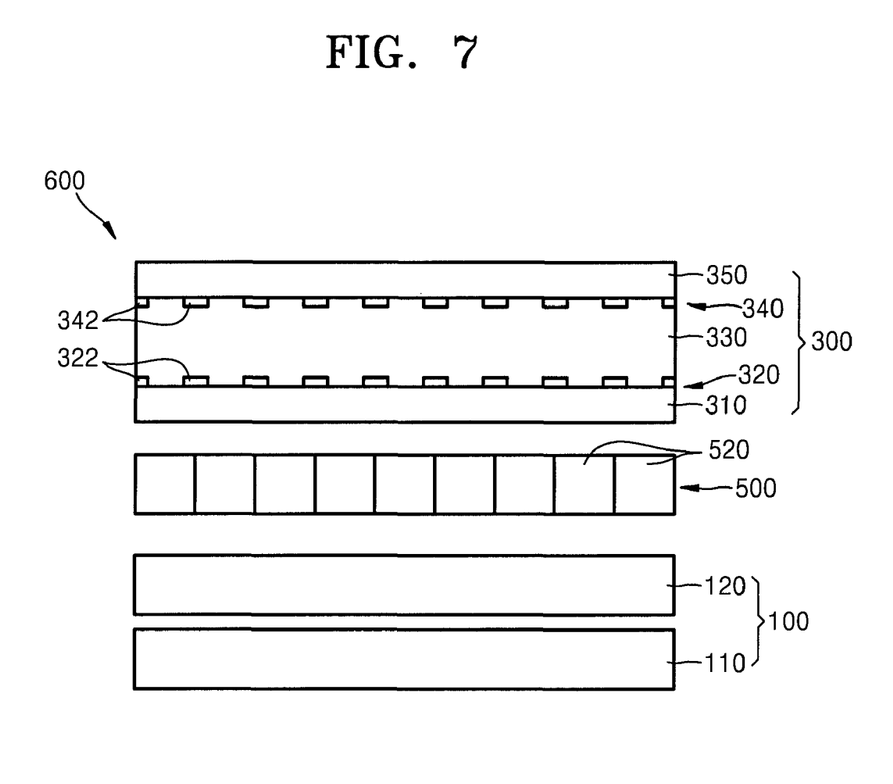
FIG. 7 is a schematic view of a 2D-3D switchable display device according to another exemplary embodiment of the present invention.

FIG. 7 is a schematic view of a 2D-3D switchable display device 600 according to another exemplary embodiment of the present invention. Referring to FIG. 7, the 2D-3D image display apparatus 600 includes a display unit 100 forming an image, a Grin lens array 500 separating visual fields of an image formed by the display unit 100, and a liquid crystal lens 300 controlled so as to reinforce or offset refractive power of the Grin lens array 500. The current exemplary embodiment of the present invention is the same as 2D-3D switchable display device 400 of FIG. 2 except that the 2D-3D image display apparatus 600 includes the flat type Grin lens array 500 that is a lens array for separating visual fields. The Grin lens array 500 includes a plurality of green lenses 520. The Grin lens 520 is a flat lens, but has the same refractive power as that of a spherical lens due to a distribution of a refraction index. In addition, the Grin lens 520 together with the liquid crystal lens 300 controlling the refractive power realizes the refractive power for separating visual fields and the state of refractive power of 0, and thus 3D and 2D images can be formed.

As described above, the 2D-3D switchable display device according to the present invention includes a liquid crystal lens controlling a refractive power together with a normal optical lens. According to the image display apparatus according to the present invention, a liquid crystal layer can be designed to have a smaller thickness and the optical lens can be designed to have a smaller refractive power than the case where the liquid crystal lens or the optical lens for separating the visual fields is used alone. Accordingly, the image display apparatus according to the present invention has high light efficiency and small power consumption, can easily convert 2D-3D images, and can be easily mass-manufactured.

While the 2D-3D switchable display device according to the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A 2-dimensional (2D)/3-dimensional (3D) switchable display device comprising:
    a display unit which forms an image; and
    a switching visual field separation unit which switches the image formed by the display unit into a 2D image or a 3D image, the switching visual field separation unit comprising;
    a lens array for separating a visual field and including plurality of lenses and
    a liquid crystal lens controlled so as to have a refractive power offsetting or reinforcing a refractive power of the lens array,
    wherein the liquid crystal lens comprises:
    a first substrate having a first surface on which a first electrode array is disposed and a second surface opposite to the first surface facing the lens array;
    a second substrate having a first surface on which a second electrode array is disposed facing the first surface of the first substrate; and
    a liquid crystal layer formed between the first substrate and the second substrate,
    wherein the first electrode array includes a plurality of first electrodes and each of the plurality of first electrodes face each interface of the plurality of lenses included in the lens array.

2. The device of claim 1, wherein the second electrode array comprises a plurality of second electrodes facing the plurality of first electrodes.

3. The device of claim 2, wherein when voltage is applied to the first electrode array so that the adjacent first electrodes have electric potential of the same absolute value and opposite sign to each other, and a voltage is not applied to the second electrode array, a 3D image is formed, and when voltage is applied to the second electrode array so that the adjacent second electrodes have electric potential of the same absolute value and opposite sign to each other, and a voltage is not applied to the first electrode array, a 2D image is formed.

4. The device of claim 1, wherein the display unit comprises:
 a backlight; and
 a non-emissive display device forming an image using light emitted from the backlight.

5. The device of claim 1, wherein the display unit comprises a self-emissive display device.

6. The device of claim 1, wherein the lens array is a flat type Grin lens array.

7. The device of claim 1, wherein the lens array is a lenticular lens array.

8. The device of claim 7, wherein the lenticular lens array is arranged so that the length of a lenticular lens is inclined toward a vertical direction of an image display apparatus.

9. The device of claim 1, wherein the lens array is a micro lens array 2-dimensionally arranged.

10. The device of claim 9, wherein micro lenses of the micro lens array are arranged in zigzags.

* * * * *